Aug. 8, 1950     W. E. DOUGHTY     2,517,773
SIRUP COOLER
Filed June 17, 1946
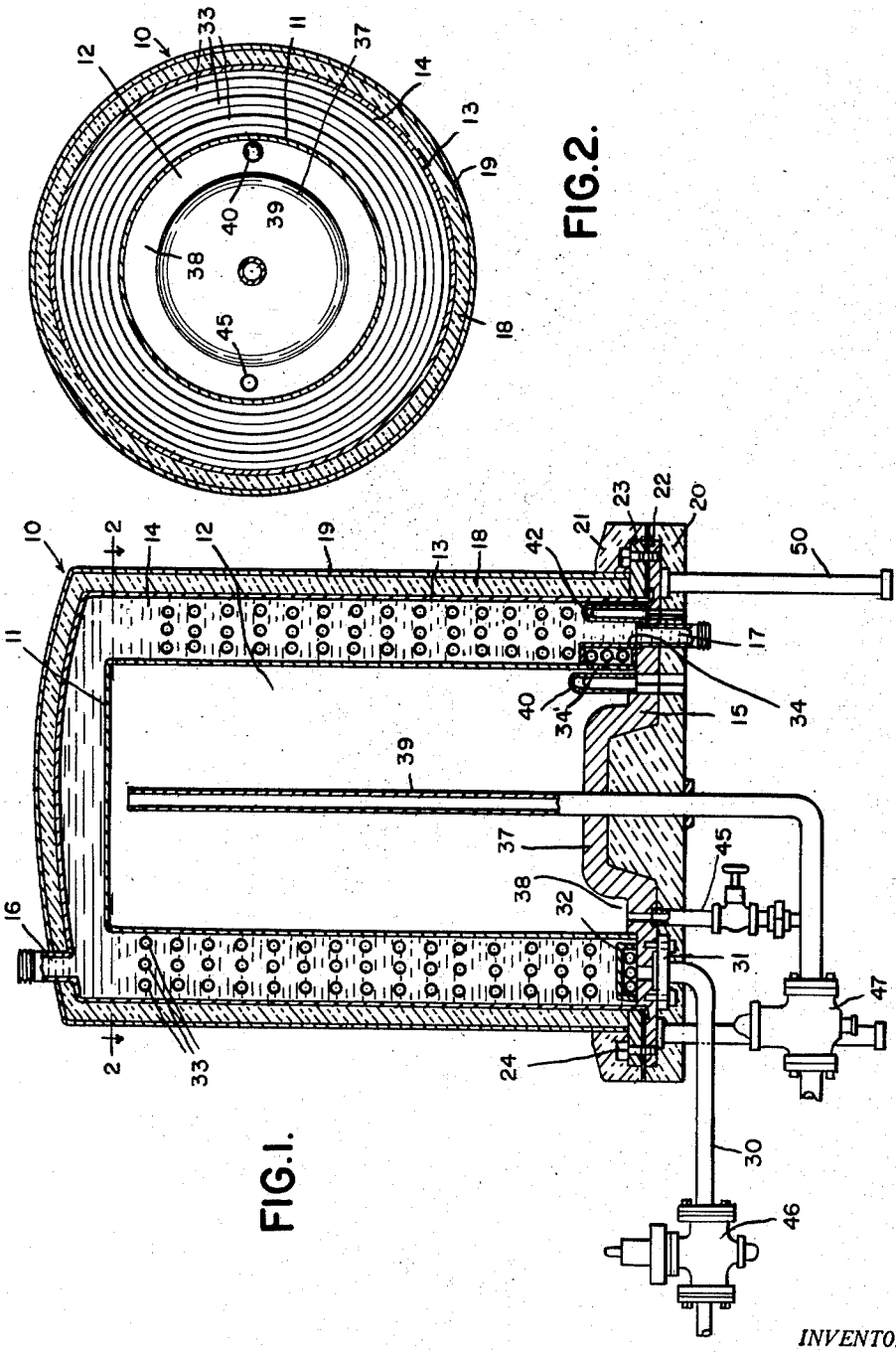
INVENTOR.
WILLIAM E. DOUGHTY
BY
Whittemore, Hulbert
& Belknap.   ATTORNEYS Patented Aug. 8, 1950

2,517,773

UNITED STATES PATENT OFFICE 2,517,773

SIRUP COOLER

William E. Doughty, Detroit, Mich., assignor to James Vernor Company, Detroit, Mich., a corporation of Michigan Application June 17, 1946, Serial No. 677,181

12 Claims. (Cl. 62—141)

The present invention relates to a cooler and more particularly to a cooler of the type adapted to serve in cooling sirup.

It is an object of the present invention to provide a cooler characterized by the ease and efficiency with which it may be cleaned. It is a further object of the present invention to provide a cooler for liquids characterized by the small amount of liquid refrigerant that remains in the unit. It is a further object of the present invention to provide a cooler for liquids characterized by the extreme efficiency of refrigeration.

It is a feature of the present invention to provide a cooler for liquids in the form of a central relatively large accumulator chamber into which refrigerant is introduced in liquid phase, this accumulator chamber being largely surrounded by a wall spaced substantially uniformly therefrom and adapted to define therewith a container for the liquid being cooled. It is a further feature of the present invention to provide a cooler for liquids in the form of a pair of substantially uniformly spaced nested domes both closed at their bottom and adapted to define a central accumulator chamber and an outer container for the liquid to be cooled. It is a further feature of the present invention to provide a cooler for liquids in the form of a container for the liquid to be cooled having at least one wall thereof in contact with the interior of a closed accumulator chamber in which means are provided for introducing refrigerant in liquid phase to the interior of the accumulator chamber. Other objects and features will become apparent as the description proceeds, particularly when taken in conjunction with the appended drawings, wherein:

Figure 1 is a vertical section through my improved cooler with the necessary valve means and electrical connections more or less diagrammatically shown; and Figure 2 is a partial section on the line 2—2 of Figure 1.

Referring to the drawings, the cooler 10 is shown as comprising an inner dome 11, the interior 12 of which forms an accumulator chamber; an outer dome 13 spaced substantially uniformly from the inner dome 11 and defining therewith a container or space 14 for the reception of liquid to be cooled; and a bottom closure plate 15 adapted to close both the accumulator chamber 12 and the liquid container 14.

Suitable sealing means are provided at the bottom of the domes 11 and 13 for providing a sealed engagement with the closure plate 15, which is illustrated as supported on legs 50. Preferably the domes 11 and 13 are formed of stainless steel although it will be apparent that any suitable material may be employed. The outer dome 13 is provided adjacent its top with an inlet 16 which opens into the liquid container 14, and the closure plate 15 is provided with an outlet 17 opening into the interior of the liquid container. The liquid to be cooled, such, for example, as sirup, will flow in the inlet 16 and it is contemplated that in use the liquid will completely fill the container 14 formed between the domes 11 and 13.

Suitable insulation is provided which completely surrounds the outer dome 13, this insulation being indicated at 18, and there being also illustrated a third dome 19 surrounding the insulating material and giving an attractive finished appearance to the cooler. The dome 19 is also preferably formed of stainless steel. In order to complete the insulation of the unit I have illustrated insulating material 20 adapted to be secured to the under surface of the plate 15 and a removable insulating ring 21 adapted to cooperate with the insulating material 20 to complete the insulation of the flange 22 forming a part of the closure plate 15 and a clamping ring 23 which is bolted to the flange 22 as indicated at 24. It will thus be seen that the cooler is substantially completely insulated and that therefore heat lost therefrom will be held to a minimum.

Preferably the inner dome 11 is rigidly secured to the closure plate 15 in sealed relation thereto and the outer dome 13 is detachably mounted on the closure plate 15. For this purpose the outer dome 13 may be welded or otherwise secured in sealed relation to the ring 23 which is adapted to be clamped to the flange of the closure plate 15.

Liquid refrigerant under pressure is introduced into the cooler through a pipe 30 coupled to the closure 15 as indicated at 31, there being an opening through the closure plate 15 into a header 32. As illustrated, three sets of coils 33 connect into the header 32, but it will be appreciated that if desired a lesser number, such, for example, as a single coil, may be employed. The coil or coils are provided with a plurality of turns extending around the space between the inner and outer domes 11 and 13 and eventually open into the interior of the accumulator chamber 12.

In the preferred form of my invention the coil or coils 33 open into the interior of the accumulator chamber 12 adjacent the bottom thereof. For this purpose coils 33 extend in convolutions, first upwardly and then downwardly through the receptacle 14 and open into a discharge manifold 34. The discharge manifold 34 in turn opens into the interior of the accumulator chamber 12 adjacent the bottom thereof as indicated at 34' and as shown adjacent a thermally responsive element 40 later to be described. The bottom closure 15 is provided with an upwardly extending shallow dome portion 37 which defines with the lower portion of the inner dome 11 a shallow annular well 38. Extending upwardly through the center of the shallow dome portion 37 is an exhaust pipe 39 having its open end substantially adjacent the top of the accumulator space 12.

A drain connection 45 for liquid refrigerant opens into the well 38 and a thermally responsive element 40 is also located in the well 38. A second thermally responsive element 42 is located adjacent the bottom of the liquid container 14.

The flow of coolant through the inlet pipe 30 is controlled by a modulating valve 46 controlled by element 40. The drain connection 45 opens into the outlet pipe 39 exterior of the cooler and the pipe 39 is connected to the suction side of the compressor (not shown) through a back pressure valve 47.

The operation of the improved cooler is believed to be apparent from the foregoing description but will be briefly reviewed. Liquid coolant from the compressor flows through the inlet pipe 30 and the coils 33 in an amount controlled by the valve 46. The thermally responsive element 42 which is located in the liquid container and at the coldest portion thereof is adapted to exercise an on-and-off control of the modulating valve 46. Liquid refrigerant passing through the coils 33 undergoes expansion and exercises a substantial cooling effect upon the liquid in the space between the inner dome 11 and the outer dome 13. The refrigerant passes into the manifold 34 and thence expands into the interior of the accumulator chamber 12 whence it is drawn off in vapor phase through the outlet pipe 39.

Pressure in the accumulator chamber 12 is maintained at a reduced value by the exhaust pipe 39 which connects to the suction side of the compressor and this pressure may be controlled as desired by the back pressure valve 47.

Reference was initially made to the fact that the cooler is designed to facilitate ease and efficiency of cleaning. It will be appreciated that the liquid container space 14 may be readily cleaned in an efficient manner simply by passing hot water through the space between the domes. If a more thorough cleaning is desired the outer dome 13 may be removed from the plate 15 by releasing the clamping ring 23, at which time the coils 33 are exposed for mechanical cleaning if such is necessary or desired.

During operation of the cooling apparatus liquid refrigerant may collect in the well 38 formed between the shallow dome 37, the plate 15, and the lower portion of the inner dome 11. If it is desired to clean the liquid container space 14 by flushing hot water therethrough, the presence of liquid refrigerant in the well 38 would lead to dangerous conditions inasmuch as the rapid vaporization of the liquid refrigerant might induce dangerous pressures within the accumulator chamber. Accordingly, means are provided for draining any liquid from the well 38 prior to flushing the liquid container space 14. This means takes the form of the drain pipe 45 provided with a suitable valve which is normally closed during operation of the apparatus. The pipe 45 connects to the suction line 39 and accordingly when the valve in the line 45 is opened liquid refrigerant remaining in the well 38 is drawn from the interior of the accumulator chamber and returned to the compressor.

While there is illustrated and described a preferred embodiment of an improved cooler, it will be understood that the specific disclosure is made for the purpose of enabling those skilled in the art to practice the present invention, the scope of which is indicated by the appended claims.

What I claim as my invention is:

1. A cooler comprising spaced, nested inner and outer domes providing a space therebetween for liquid to be cooled, a refrigerant coil in said space, a valve controlling flow of refrigerant through said coil, a bottom closure plate, said plate having a relatively short central domed portion defining with the lower edge of said inner dome an annular well for liquid refrigerant, and temperature responsive means in said well effective to control said valve.

2. A cooler comprising spaced, nested inner and outer domes providing a space therebetween for liquid to be cooled, a refrigerant coil in said space, a valve controlling flow of refrigerant through said coil, a bottom closure plate, said plate having a relatively short central domed portion defining with the lower edge of said inner dome an annular well for liquid refrigerant, temperature responsive means in said well to effect a control of said valve, and other temperature responsive means in the space between said domes to effect a further control of said valve.

3. A cooler comprising spaced, nested inner and outer unitary domes, a bottom closure plate, a refrigerant coil in the space between said domes discharging into said inner dome, said domes defining therebetween a space for the reception of liquid to be cooled, and refrigerant exhaust means having an intake adjacent the top of said inner dome, said exhaust means comprising a vertical pipe passing through said closure plate and having an open top adjacent the top of said inner dome.

4. A cooler for liquid comprising inner and outer domes, defining therebetween a space for liquid to be cooled, a closure plate effective to close the bottoms of both of said domes, a refrigerant coil in said space opening into the interior of said inner dome, said outer dome being readily removable to expose the outer wall of said inner dome and said coil for cleaning.

5. A cooler of the character described comprising a bottom plate, an inner dome secured to said plate and defining therewith an accumulator chamber, an outer dome overlying said inner dome and spaced substantially uniformly outwardly therefrom to define therewith a container for liquid to be cooled which surrounds said accumulator chamber, refrigerant coils located in said container and arranged to discharge refrigerant into said accumulator chamber, said outer dome being detachably mounted on said bottom plate and removable therefrom to provide access to said coils for cleaning.

6. Apparatus of the character described comprising an accumulator chamber formed by a base plate and an inner dome secured thereto, said base plate including a flange extending radially beyond said dome, a refrigerant coil surrounding said dome and located above said flange and connected to discharge refrigerant into said accumulator chamber, an outer dome having its lower edge detachably secured to said flange and defining with said inner dome a space for the reception of liquid to be cooled, said outer dome being removable as a unit upwardly to expose the outer surface of said inner dome and said coil for cleaning.

7. Apparatus of the character described comprising an accumulator chamber formed by a base plate and an inner dome secured thereto, said base plate including a flange extending radially beyond said dome, a refrigerant coil surrounding said dome and located above said flange and connected to discharge refrigerant into said accumulator chamber, an outer dome of one piece construction having its lower edge detachably secured to said flange and defining with said inner dome a space for the reception of liquid to be cooled, said outer dome being removable as a unit upwardly to expose the outer surface of said inner dome and said coil for cleaning.

8. Apparatus of the character described comprising an accumulator chamber formed by a base plate and an inner dome secured thereto, said base plate including a flange extending radially beyond said dome, a refrigerant coil surrounding said dome and located above said flange and connected to discharge refrigerant into said accumulator chamber, an outer dome formed of a single piece of sheet metal having its lower edge detachably secured to said flange and defining with said inner dome a space for the reception of liquid to be cooled, said outer dome being removable as a unit upwardly to expose the outer surface of said inner dome and said coil for cleaning.

9. A cooler comprising spaced, nested inner and outer domes, a bottom closure plate, said plate having a short central domed portion of slightly less diameter than the diameter of said inner dome and spaced a short distance inwardly substantially uniformly from the bottom edge of said inner dome to define a relatively narrow annular well, an inlet for admitting refrigerant into said inner dome, and a valve controlled drain connection opening into the bottom of said well.

10. A cooler comprising spaced, nested inner and outer domes, a bottom closure plate, said plate having a short central domed portion spaced a short distance inwardly substantially uniformly from the bottom edge of said inner dome to define a relatively narrow annular well, an inlet for admitting refrigerant into said inner dome, a suction line having an inlet adjacent the top of said inner dome, and a valve controlled drain connection having an inlet at the bottom of said well and connected to said suction line.

11. A cooler comprising spaced, nested inner and outer domes, a bottom closure plate, said plate having a short central domed portion spaced a short distance inwardly substantially uniformly from the bottom edge of said inner dome to define a relatively narrow annular well, refrigerant coils located between said domes and connected to discharge into said inner dome, a suction line having an inlet adjacent the top of said inner dome, and a valve controlled drain connection having an inlet at the bottom of said well and connected to said suction line.

12. A cooler comprising a bottom closure plate, an inner dome having its lower edge sealed thereto, an outer dome the side walls of which are spaced laterally from the side walls of said inner dome and the top wall of which is spaced vertically from the top wall of said inner dome, a refrigerant coil in the space between the side walls of said domes, means for detachably securing the lower edge of said outer dome in sealed relation to said bottom closure plate, means extending through said bottom closure plate for admitting refrigerant to said coil, means discharging refrigerant from said coil into the said inner dome, and a refrigerant exhaust connection extending through said bottom closure plate into the interior of said inner dome.

WILLIAM E. DOUGHTY.

REFERENCES CITED

The following references are of record in the file of this patent:

UNITED STATES PATENTS

| Number | Name | Date |
|---|---|---|
| 346,038 | Goldschmid | July 20, 1886 |
| 1,478,120 | Hill | Dec. 18, 1923 |
| 1,794,483 | Shepherd | Mar. 3, 1931 |
| 1,895,085 | Peltier | Jan. 24, 1933 |